(12) United States Patent
Hanawa et al.

(10) Patent No.: US 10,041,427 B2
(45) Date of Patent: Aug. 7, 2018

(54) SENSOR OUTPUT VALUE ESTIMATION DEVICE

(71) Applicants: ISUZU MOTORS LIMITED, Tokyo (JP); TRANSTRON INC., Yokohama-shi, Kanagawa (JP)

(72) Inventors: Satoshi Hanawa, Fujisawa (JP); Yoshiaki Ikai, Fujisawa (JP)

(73) Assignees: ISUZU MOTORS LIMITED, Tokyo (JP); TRANSFORM INC, Yokohama (JP)

( * ) Notice: Subject to any disclaimer, the term of this patent is extended or adjusted under 35 U.S.C. 154(b) by 290 days.

(21) Appl. No.: 14/908,297

(22) PCT Filed: Jul. 31, 2014

(86) PCT No.: PCT/JP2014/070197
§ 371 (c)(1),
(2) Date: Jan. 28, 2016

(87) PCT Pub. No.: WO2015/016304
PCT Pub. Date: Feb. 5, 2015

(65) Prior Publication Data
US 2016/0160777 A1    Jun. 9, 2016

(30) Foreign Application Priority Data

Jul. 31, 2013  (JP) ................................. 2013-159190

(51) Int. Cl.
*F02D 41/14*   (2006.01)
*F02D 41/22*   (2006.01)
(Continued)

(52) U.S. Cl.
CPC ..... *F02D 41/1447* (2013.01); *F02D 41/1446* (2013.01); *F02D 41/222* (2013.01);
(Continued)

(58) Field of Classification Search
CPC ............ F02D 41/1447; F02D 41/1446; F02D 41/222; F02D 2041/1431; G01K 7/42;
(Continued)

(56) References Cited

U.S. PATENT DOCUMENTS 5,544,639 A      8/1996   Shouda et al.
6,978,203 B2 *  12/2005   Yasui .................. F02D 41/1494
                                                              701/101

(Continued)

FOREIGN PATENT DOCUMENTS

EP    2 458 167 A1    5/2012
JP    7-119514         5/1995
JP    2008-76311       4/2008

OTHER PUBLICATIONS

International Preliminary Report on Patentability dated Feb. 2, 2016 in corresponding International Patent Application No. PCT/JP2014/070197.

(Continued)

*Primary Examiner* — Lisa Caputo
*Assistant Examiner* — Philip Cotey
(74) *Attorney, Agent, or Firm* — Staas & Halsey LLP

(57) ABSTRACT

A sensor output value estimation device that effectively estimates sensor output values reflecting a response delay of a temperature sensor. The device includes an estimated gas temperature calculation unit for calculating an estimated gas temperature of an engine on a basis of at least a running condition of the engine and a state quantity of the gas in the engine. The device also includes an estimated sensor output value calculation unit for calculating an estimated sensor output value reflecting the response delay of the temperature sensor on a basis of the calculated estimated gas temperature and a pre-stored first model formula specifying a relation (Continued)

among the temperature change time constant of the temperature sensor, the gas flow rate, and the gas temperature.

11 Claims, 3 Drawing Sheets

(51) Int. Cl.
*G01K 7/42* (2006.01)
*F02M 26/05* (2016.01)
*F02M 26/23* (2016.01)

(52) U.S. Cl.
CPC ........ *G01K 7/42* (2013.01); *F02D 2041/1431* (2013.01); *F02M 26/05* (2016.02); *F02M 26/23* (2016.02); *G01K 2205/04* (2013.01); *Y02T 10/40* (2013.01)

(58) Field of Classification Search
CPC .... G01K 2205/04; F02M 26/05; F02M 26/23; Y02T 10/40
See application file for complete search history.

(56) References Cited

U.S. PATENT DOCUMENTS

| | | | | |
|---|---|---|---|---|
| 7,047,728 | B2* | 5/2006 | Yasui | F02D 41/1454 60/274 |
| 7,305,299 | B2* | 12/2007 | Yasui | F02D 41/1454 374/E7.042 |
| 7,779,626 | B2* | 8/2010 | Ohsaki | F02D 41/0072 60/276 |
| 2004/0122584 | A1* | 6/2004 | Muto | F02D 41/0072 701/108 |
| 2004/0144079 | A1* | 7/2004 | Nagai | B01D 53/9495 60/276 |
| 2006/0142932 | A1* | 6/2006 | Yasui | F01L 1/352 701/114 |
| 2007/0006574 | A1* | 1/2007 | Nakano | F01N 9/005 60/285 |
| 2007/0214774 | A1* | 9/2007 | Higuchi | F02D 41/025 60/285 |
| 2009/0133483 | A1* | 5/2009 | Poilane | F01N 3/0842 73/114.69 |
| 2009/0141768 | A1 | 6/2009 | He et al. | |
| 2009/0143959 | A1* | 6/2009 | Yamaoka | F02D 41/0002 701/108 |
| 2010/0071451 | A1 | 3/2010 | Matsunaga et al. | |
| 2010/0307139 | A1* | 12/2010 | Li | F01N 3/027 60/286 |
| 2011/0166768 | A1* | 7/2011 | Yamaoka | F02D 41/0245 701/103 |
| 2011/0231081 | A1* | 9/2011 | Suzuki | F01N 11/005 701/104 |

OTHER PUBLICATIONS

Extended European Search Report dated Mar. 7, 2017 in corresponding European Patent Application No. 14831966.8.
International Search Report dated Nov. 11, 2014 in corresponding International Application No. PCT/JP2014/070197.
Japan Platform for Patent Information, English Abstract of Japanese Publication No. 7-119514 published May 9, 1995.
Japan Platform for Patent Information, English Abstract of Japanese Publication No. 2008-76311 published Apr. 3, 2008.

* cited by examiner

SENSOR OUTPUT VALUE ESTIMATION DEVICE

CROSS-REFERENCE TO RELATED APPLICATIONS

This application is a U.S. National Stage Application, which claims the benefit under 35 U.S.C. § 371 of PCT International Patent Application No. PCT/JP2014/070197, filed Jul. 31, 2014, which claims the foreign priority benefit under 35 U.S.C. § 119 of Japanese Patent Application No. 2013-159190, filed Jul. 31, 2013, the contents of which are incorporated herein by reference.

TECHNICAL FIELD

The present invention relates to a sensor output value estimation device, and relates in particular to estimating a sensor output value that reflects a response delay of a sensor.

BACKGROUND ART

Temperature sensors are used in controls of an aftertreatment device for purifying an exhaust gas from an engine, an exhaust gas recirculation (hereinafter referred to as "EGR") device for partially recirculating the exhaust gas into an intake system, and other elements. When a temperature sensor malfunctions due to its fault or the like, such controls may not be carried out properly.

In light of this problem, there is known a technique in which malfunctioning of a temperature sensor is detected by comparing an estimated gas temperature, which is estimated on the basis of the running condition of the engine, with a sensor value of the temperature sensor (see, for example, PATENT LITERATURE DOCUMENT 1).

LISTING OF REFERENCES

PATENT LITERATURE DOCUMENT 1: Japanese Patent Application Laid-Open Publication (Kokai) No. 2008-76311

An output of a temperature sensor experiences a response delay with respect to an actual temperature change. Thus, an accurate diagnosis may not be made in a rationality diagnosis that simply compares an estimated temperature, which is estimated as an actual temperature of gas inside the engine, with a sensor output value detected by a temperature sensor because a difference arises between the sensor value and the estimated value due to a response delay. In other words, in order to improve the accuracy in a diagnosis, it is important to estimate a sensor output value that reflects an influence of a response delay.

SUMMARY OF THE INVENTION

An object of the present invention is to effectively estimate a sensor output value that reflects a response delay of a temperature sensor.

A sensor output value estimation device disclosed herein includes an estimated gas temperature calculating unit that calculates an estimated gas temperature of an engine on the basis of at least a running condition of the engine and a quantity of state of a gas in the engine, and an estimated sensor output value calculating unit that calculates an estimated sensor output value that reflects a response delay of a temperature sensor on the basis of the calculated estimated gas temperature and a pre-stored first model formula that defines a relation among a time constant of a temperature change of the temperature sensor, a gas flow rate, and a gas temperature.

According to a sensor output value estimation device disclosed herein, a sensor output value that reflects a response delay of a temperature sensor can be estimated effectively.

DETAILED DESCRIPTION

Figure 1:
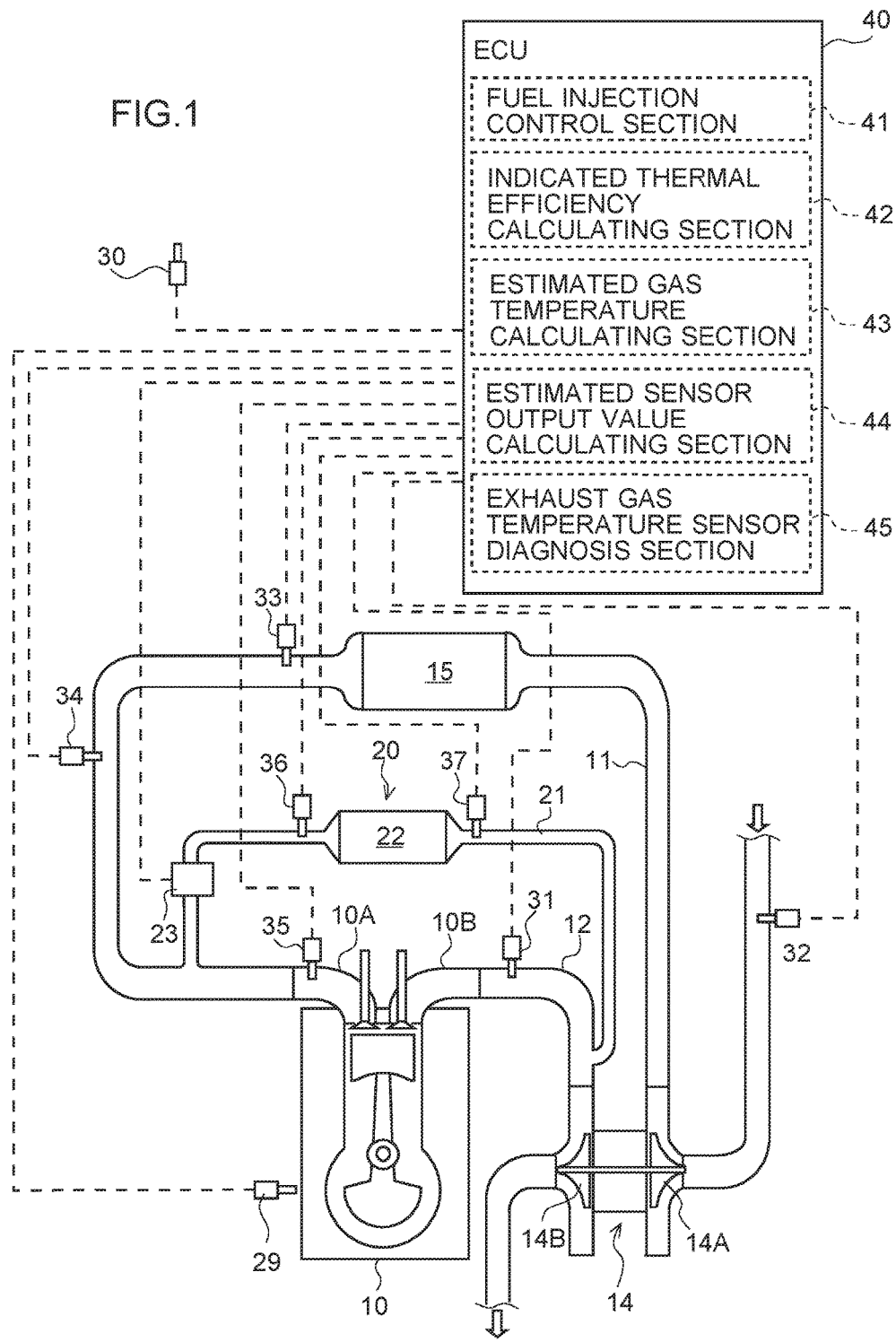
FIG. 1 is an overall configuration diagram schematically illustrating a sensor output value estimation device according to an embodiment of the present invention.

Hereinafter, a sensor output value estimation device according to an embodiment of the present invention will be described with reference to FIGS. 1 to 3. Identical parts are given identical reference numerals and symbols, and their names and functions are identical as well. Therefore, detailed description of such parts will not be repeated.

As illustrated in FIG. 1, a diesel engine (hereinafter simply referred to as "engine") 10 has an intake manifold 10A and an exhaust manifold 10B. The intake manifold 10A is connected to an intake passage (intake pipe) 11 for introducing fresh air, and the exhaust manifold 10B is connected to an exhaust passage (exhaust pipe) 12 for discharging an exhaust gas to the atmosphere.

The exhaust passage 12 has an exhaust gas temperature sensor 31, a turbine 14B of a turbo charger 14, and an exhaust gas aftertreatment device (not illustrated). The exhaust gas temperature sensor is located upstream of the turbine, and the turbine is located upstream of the exhaust gas aftertreatment device. The intake passage 11 has a mass air flow ("MAF") sensor 32, a compressor 14A of the turbo charger 14, an intercooler 15, an intake air temperature sensor 33, an intake air oxygen concentration sensor 34, and a boost pressure sensor 35. The MAF sensor 32, the compressor 14A of the turbo charger, the intercooler 15, the intake air temperature sensor 33, the intake air oxygen concentration sensor 34, and the boost pressure sensor 35 are arranged in this order from the upstream side. Sensor values detected by the sensors 31 to 35 are supplied to an electronic control unit (hereinafter referred to as "ECU") 40, which is electrically connected the sensors 31 to 35.

An EGR device 20 includes an EGR passage 21 for recirculating some of the exhaust gas into the intake system, an EGR cooler 22 for cooling an EGR gas, and an EGR valve 23 for regulating the flow rate of the EGR gas. A cooler inlet temperature sensor 37 for detecting the temperature of the exhaust gas taken in from the exhaust passage 12 is provided in the EGR passage 21 on the upstream (inlet) side of the EGR cooler 22. A cooler outlet temperature sensor 36 for detecting the temperature of the EGR gas cooled by the EGR cooler 22 is provided in the EGR passage 21 on the downstream (outlet) side of the EGR cooler 22.

The sensor values detected by the sensors 36 and 37 are supplied to the ECU 40, which is electrically connected to the sensors 36 and 37.

An engine rotation speed sensor 29 detects the number of rotations of a crankshaft (not illustrated) per unit time. An accelerator position sensor 30 detects the accelerator position corresponding to a depressed amount of an accelerator pedal (not illustrated). The sensor values detected by the sensors 29 and 30 are supplied to the ECU 40, which is electrically connected to the sensors 29 and 30.

The ECU 40 controls fuel injection and other functions of the engine 10, and includes publicly known CPU, ROM, RAM, input port, output port, and other elements and devices. The ECU 40 further includes, as some of its functional elements, a fuel injection control section 41, an indicated thermal efficiency calculating section 42, an estimated exhaust gas temperature calculating section 43, an estimated sensor output value calculating section 44, and an exhaust gas temperature sensor diagnosis section 45. The description continues with a premise that these functional elements are included in the ECU 40, which is an integrated piece of hardware, but some of these functional elements may be provided in a separate piece of hardware.

The fuel injection control section 41 controls the fuel injection timing and the fuel injection amount of a fuel injection device (not illustrated) of the engine 10 on the basis of the engine revolution speed N entered from the engine rotation speed sensor 29 and the accelerator position Q entered from the accelerator position sensor 30.

The indicated thermal efficiency calculating section 42 constitutes part of an estimated gas temperature calculating unit of the present invention, and calculates an amount of change $\Delta \eta_i$ in the indicated thermal efficiency of the engine 10 on the basis of the sensor values detected by the sensors 29 to 37, model formulas (will be described later), and so on. The calculation procedures will now be described in detail.

The conservation of energy in cylinders of the engine 10 is expressed by the following expression (1), which indicates a relation among exhaust gas energy $H_{ex}$, intake air energy $H_{in}$, fuel combustion energy $Q_{fuel}$, cooling loss energy $U_{hloss}$, and indicated work $W_{id}$ of the engine 10.

$$H_{ex} = H_{in} + Q_{fuel} - U_{hloss} - W_{id} \qquad [\text{Math. 1}]$$

The indicated thermal efficiency m of the engine 10 is expressed by the following expression (2), which indicates the ratio of the indicated work $W_{id}$ to the combustion energy $Q_{fuel}$.

$$\eta_i + W_{id}/Q_{fuel} \qquad [\text{Math. 2}]$$

When the indicated work $W_{id}$ of the expression (2) is substituted into the expression (1), the exhaust gas energy $H_{ex}$ is expressed by the following expression (3).

$$H_{ex} = (1-\eta_i) Q_{fuel} - U_{hloss} + H_{in} \qquad [\text{Math. 3}]$$

An amount of change $\Delta H_{ex}$, from the reference exhaust gas energy $H_{ex,ref}$ is calculated on the basis of the expression (3), and the result is expressed by the following expression (4).

$$\Delta H_{ex} = H_{ex} - H_{ex,ref} \qquad [\text{Math. 4}]$$
$$= [(1 - \eta_i) Q_{fuel} - U_{hloss} + H_{in}] -$$
$$[(1 - \eta_{i,ref}) Q_{fuel,ref} - U_{hloss,ref} + H_{in,ref}]$$

Provided that the fuel injection amount is constant and the change in the cooling loss energy $U_{hloss}$ is very small in the expression (4), the amount of change $\Delta H_{ex}$ in the exhaust gas energy is approximated by the following expression (5).

$$\Delta H_{ex} \approx H_{in} - H_{in,ref} - \Delta \eta_i \cdot Q_{fuel} \qquad [\text{Math. 5}]$$

An estimated temperature of the exhaust gas discharged from the engine 10 (hereinafter referred to as "engine outlet estimated exhaust gas temperature") $T_3$ is expressed by the following expression (6) on the basis of $\Delta H_{ex} = H_{ex} - H_{ex,ref}$ of the expression (4).

$$T_3 = \frac{1}{c_{p,ex} \cdot m_{ex}} (H_{ex,ref} + \Delta H_{ex}), \text{ where} \qquad [\text{Math. 6}]$$
$$H_{ex} = c_{p,ex} T_3 m_{ex}$$

When the expression (5) is substituted into the expression (6), the engine outlet estimated exhaust gas temperature $T_3$ is expressed by the following expression (7) (third model formula), where $C_{p,in}$ represents specific heat at constant pressure of the intake air, $m_{ex}$ represents the exhaust gas flow rate, $H_{ex,ref}$ represents the reference exhaust gas energy, $Q_{in,ref}$ represents reference intake air energy, $H_{in}$ represents the exhaust gas energy, and $Q_{fuel}$ represents the combustion energy.

$$T_3 = \frac{1}{c_{p,ex} \cdot m_{ex}} (H_{ex,ref} + H_{in} - H_{in,ref} - \Delta \eta_i \cdot Q_{fuel}) \qquad [\text{Math. 7}]$$

As the factors that may cause a change in the indicated thermal efficiency $\eta_i$, a fuel injection start timing $\phi$ and an intake air oxygen concentration $X_{O2}$ will now be considered. Provided that the change in the amount of change $\Delta \eta_i$ in the indicated thermal efficiency with respect to the intake air oxygen concentration $X_{O2}$ is linear, the amount of change $\Delta \eta_i$ in the indicated thermal efficiency is approximated by a Taylor expansion as in the following expression (8), where $X_{O2}$ represents an intake air oxygen concentration, $\phi$ represents the injection start timing, $K_{1,O2}$ represents the intake air oxygen concentration correction coefficient, $X_{O2,ref}$ represents a reference intake air oxygen concentration, $k_{n(n=1,2),soi}$ represents an injection start timing correction coefficient, and $\phi_{ref}$ represents a reference injection start timing.

$$\Delta \eta_i = \eta_i - \eta_{i,ref} \approx k_{1,soi} \cdot (\phi - \phi_{ref}) + k_{1,o_2} \cdot (x_{o_2} - x_{o_2,ref}) + \qquad [\text{Math. 8}]$$
$$k_{2,soi} \cdot (\phi - \phi_{ref})^2 + k_{2,soi \cdot o2} \cdot (\phi - \phi_{ref}) \cdot (x_{o_2} - x_{o_2,ref})$$

Provided that an influence of the interaction term between the injection start timing $\phi$ and the intake air oxygen concentration $X_{O2}$ is very small in the expression (8), the amount of change $\Delta \eta_i$ in the indicated thermal efficiency is expressed by the following expression (9) (second model formula).

$$\Delta \eta_i = k_{1,soi} \cdot (\phi - \phi_{ref}) + k_{1,o_2} \cdot (x_{o_2} - x_{o_2,ref}) + k_{2,soi} \cdot (\phi - \phi_{ref})^2 \qquad [\text{Math. 9}]$$

The indicated thermal efficiency calculating section 42 calculates the amount of change $\Delta \eta_i$ in the indicated thermal efficiency in real time on the basis of the expression (9). More specifically, the ECU 40 stores a correction value map (not illustrated) that defines a relation among the engine revolution speed N, the accelerator position Q, and the intake air oxygen concentration correction coefficient $K_{1,O2}$, and also stores a reference value map (not illustrated) that defines a relation among the engine revolution speed N, the accelerator position Q, and the reference intake air oxygen concentration $X_{O2,ref}$. These maps are prepared in advance through experiments or the like. The ECU 40 further stores another correction value map (not illustrated) that defines a relation among the engine revolution speed N, the accelerator position Q, and the injection start timing correction coefficient $k_{n(n=1,2),soi}$, and another reference value map (not illustrated) that defines a relation among the engine revolution speed N, the accelerator position Q, and the reference injection start timing $\phi_{ref}$. These maps are also prepared in advance through experiments or the like.

The indicated thermal efficiency calculating section 42 reads out the values corresponding to the running condition of the engine 10 from the maps and substitutes the values into the expression (9). In addition, the indicated thermal efficiency calculating section 42 substitutes into the expression (9) the intake air oxygen concentration $X_{O2}$, which is entered from the intake air oxygen concentration sensor 34, and the injection start timing $\phi$, which is determined by the fuel injection control section 41. Thus, the amount of change $\Delta \eta_i$ in the indicated thermal efficiency that reflects the amount of change from the reference intake air oxygen concentration $X_{O2,ref}$ and the amount of change from the reference injection start timing $\phi_{ref}$ is calculated in real time in accordance with the running condition of the engine 10.

The estimated gas temperature calculating section 43 constitutes part of an estimated gas temperature calculating unit of the present invention, and calculates the engine outlet estimated exhaust gas temperature $T_3$ in real time on the basis of the expression (7). More specifically, the ECU 40 stores a reference value map (not illustrated) that specifies a relation among the engine revolution speed N, the accelerator position Q, and the reference intake air energy $H_{in,ref}$ and also stores another reference value map (not illustrated) that specifies a relation among the engine revolution speed N, the accelerator position Q, and the reference exhaust gas energy $H_{ex,ref}$. These maps are prepared in advance through experiments or the like.

The estimated gas temperature calculating section 43 reads out the values corresponding to the running condition of the engine 10 from these maps, and calculates the intake air energy $H_{in}$ by the following expression (10), which indicates a relation among the specific heat at constant pressure of the intake air $C_{p,in}$, an intake air temperature $T_2$, and an intake air flow rate $m_{in}$.

$$H_{in} = c_{p,in} \cdot T_2 \cdot m_{in} \quad \text{[Math. 10]}$$

The estimated gas temperature calculating section 43 further calculates the fuel combustion energy $Q_{fuel}$ by the following expression (11), which indicates a relation between a lower heating value $h_l$ of the fuel and a fuel injection amount $m_{fuel}$.

$$Q_{fuel} = h_l \cdot m_{fuel} \quad \text{[Math. 11]}$$

The estimated gas temperature calculating section 43 then calculates the engine outlet estimated exhaust gas temperature $T_3$ by substituting into the expression (7) the values read out from the maps, the values calculated by the expressions (10) and (11), the specific heat at constant pressure of the exhaust gas $C_{p,ex}$, and the exhaust gas flow rate $m_{ex}$. Thus, the engine outlet estimated exhaust gas temperature $T_3$, which varies with the running condition of the engine 10, is calculated in real time.

The estimated sensor output value calculating section 44 is an example of an estimated sensor output value calculating unit of the present invention, and carries out a calculation for bringing the engine outlet estimated exhaust gas temperature $T_3$, which is calculated by the estimated gas temperature calculating section 43, closer to the sensor output value of the exhaust gas temperature sensor 31 with the use of a secondary low pass filter (LPF) for reflecting an influence of a response delay of the exhaust gas temperature sensor 31. The detailed procedures of this calculation will now be described.

The time constant of the exhaust gas temperature sensor 31 is dependent on the exhaust gas flow rate and other factors, and is thus not constant. Therefore, the dependence relation between the time constant and the physical quantity needs to be derived from a physical formula. Provided that the heat energy conducted from the exhaust gas along the outer wall of the exhaust gas temperature sensor 31 or along the inner wall of the exhaust passage (exhaust pipe) 12 is used entirely to raise the temperature of these walls, the heat transfer formula is expressed by the following expression (12), where $\rho_w$ represents the density of the solid, $c_p$ represents the specific heat of the solid, $V_W$ represents the volume of the solid, $T_S$ represents the temperature of the wall, h represents the heat transfer coefficient, S represents the heating surface area, and $T_f$ represents the fluid temperature.

$$\rho_w c_p V_w \frac{dT_s}{dt} = -hS(T_s - T_f) \quad \text{[Math. 12]}$$

The expression (12) is transformed by a Laplace transform, and the result is expressed by the following expression (13).

$$\frac{T_s}{T_f} = \frac{1}{\tau \cdot s + 1}, \text{ where } \tau = \frac{K}{h}, K = \frac{\rho_w c_p V_w}{S} \quad \text{[Math. 13]}$$

The expression (13) shows that the time constant of the temperature change is in inverse proportion to the heat transfer coefficient h between the exhaust gas and the wall.

In this embodiment, the relation between the heat transfer coefficient of the exhaust gas temperature sensor 31 and the physical quantity is considered first. For example, provided that the phenomenon of heat transfer between the exhaust gas flow and the sensor is similar to the phenomenon of heat transfer in a column placed in a uniform flow, the mean heat transfer coefficient of the columnar sensor placed in the uniform flow is expressed by the following expression (14), where Nu represents the Nusselt number, Re represents the Reynolds number, Pr represents the Prandtl number, and C represents a constant, on the basis of a publicly known experimental formula of the heat transfer coefficient.

$$Nu = \left(\frac{hl}{\lambda}\right) = C \cdot Re^{n1} \cdot Pr^{n2} \quad \text{[Math. 14]}$$

Dimensionless numbers in the expression (14) are rewritten in the physical quantities, and the result is then solved for the heat transfer coefficient h, which is expressed by the following expression (15), where l represents a representative length, $c_{pf}$ represents the specific heat of the fluid, $\lambda$ represents the heat transfer coefficient of the fluid, $\mu$ represents the viscosity of the fluid, ρ represents the density of the fluid, and ν represents the kinematic viscosity of the fluid.

$$h = C \cdot l^{n-1} \cdot c_{pf^{\frac{1}{3}}} \cdot \lambda^{\frac{2}{3}} \cdot \mu^{-n+\frac{1}{3}} \cdot \rho^n \cdot u^n, \text{ where } \nu = \mu/\rho \quad \text{[Math. 15]}$$

The heat transfer coefficient λ, and the viscosity μ of the exhaust gas vary depending on the temperature, and thus it is assumed that the heat transfer coefficient λ and the viscosity μ can be expressed by an approximation formula indicated as the following expression (16).

$$X = \alpha T_f^\beta \quad \text{[Math. 16]}$$

In the expression (16), α and β can be obtained by an approximation of a linear function with the following expression (17), which takes the logarithm of both α and β.

$$\log(X) = \log(\alpha) + \beta \cdot \log(T_f) \quad \text{[Math. 17]}$$

When the expression (17) is identified with the use of such values as 0 to 100° C. for the heat transfer coefficient λ, for example, and −50 to 350° C. for the viscosity μ, for example, found in a publicly known chronological scientific table or the like, the approximation formula is expressed by the following expressions (18) and (19).

$$\lambda = 1.75 \times 10^{-4} \cdot T_f^{0.878} \quad \text{[Math. 18]}$$

$$\mu = 2.82 \times 10^{-7} \cdot T_f^{0.731} \quad \text{[Math. 19]}$$

The expressions (18) and (19) are substituted into the expression (15), and the result is expressed by the following expression (20).

$$h = C \cdot l^{n-1} \cdot c_{pf}^{n2} \cdot (1.75 \times 10^{-4} \cdot T_f^{0.878})^{1-n2} \cdot (2.82 \times 10^{-7} \cdot T_f^{0.731})^{-n1+n2} \cdot \rho^{n1} \cdot u^{n1} \quad \text{[Math. 20]}$$

When the effective sectional area of the sensor is represented by $A_e$, the mass flow rate $m_f$ of the exhaust gas is expressed by the following expression (21).

$$\dot{m}_f = \rho \cdot u \cdot A_e \quad \text{[Math. 21]}$$

When the fluid density ρ and the fluid flow speed u are deleted from the expressions (20) and (21), and the fluid temperature $T_f$ and the mass flow rate $m_f$ are extracted, then the result is expressed by the following expression (22).

$$h = C' \cdot T_f^{n3} \cdot \dot{m}_f^{n1} = C'' \cdot \left(\frac{T_f}{T_{f0}}\right)^{n3} \cdot \left(\frac{\dot{m}_f}{m_{f0}}\right)^{n1} \quad \text{[Math. 22]}$$

When the expression (22) is substituted into the expression (13), the following expression (23) is obtained, where the time constant $\tau_1$ of the temperature change of the sensor is in proportion to the fluid temperature $T_f$ and the mass flow rate $m_f$. In the expression (23), $T_{f0}$ represents the reference value of the fluid temperature, and $m_{f0}$ represents the reference value of the mass flow rate.

$$\frac{T_{s1}}{T_f} = \frac{1}{\tau_1 \cdot s + 1}, \text{ where} \quad \text{[Math. 23]}$$

$$\tau_1 = \frac{K}{h} = \tau_0 \cdot \left(\frac{T_f}{T_{f0}}\right)^{-n3} \cdot \left(\frac{m'_f}{m'_{f0}}\right)^{-n1}$$

In this embodiment, the relation between the heat transfer coefficient of the exhaust passage (exhaust pipe) 12 and the physical quantity is considered next. Provided that the exhaust passage 12 is a smooth cylindrical pipe, the mean heat transfer coefficient inside the cylindrical pipe is expressed by the following expression (24) on the basis of a publicly known empirical formula.

$$Nu = \left(\frac{hl}{\lambda}\right) = C \cdot Re^{n4} \cdot Pr^{n5} \quad \text{[Math. 24]}$$

When the expression (24) is subjected to transformation similar to the expressions (14) to (23), the proportional relation between the time constant $\tau_2$ of the temperature change of the exhaust pipe and the physical quantity (fluid temperature $T_f$, mass flow rate $m_f$) is expressed by the following expression (25).

$$\frac{T_{s2}}{T_f} = \frac{1}{\tau_2 \cdot s + 1}, \text{ where} \quad \text{[Math. 25]}$$

$$\tau_2 = \frac{K}{h} = \tau_0 \cdot \left(\frac{T_f}{T_{f0}}\right)^{-n6} \cdot \left(\frac{m'_f}{m'_{f0}}\right)^{-n4}$$

In this embodiment, the relation between the estimated sensor output value $T_{est}$ of the exhaust gas temperature sensor 31 and the temperature of the wall of the exhaust passage 12 is also considered. Provided that the estimated sensor output value $T_{est}$ takes an intermediate value between the temperature $T_{s1}$ of the sensor wall and the temperature $T_{s2}$ of the exhaust pipe, the estimated sensor output value $T_{est}$ can be expressed by the following expression (26), where α represents a weighting factor.

$$T_{est} = (1-\alpha) \cdot T_{s1} + \alpha \cdot T_{s2}, \text{ where } 0 < \alpha < 1 \quad \text{[Math. 26]}$$

Provided that the temperature $T_{s1}$ of the sensor wall and the temperature $T_{s2}$ of the exhaust pipe each have a discrete time constant and vary in accordance with the expression (23) or (25), the transfer function that expresses a change in the estimated sensor output value $T_{est}$ is expressed by the following expression (27) (first model formula) as a secondary LPF.

$$\frac{T_{est}}{T_f} = (1-\alpha) \cdot \frac{T_{s1}}{T_f} + \alpha \cdot \frac{T_{s2}}{T_f} = \frac{1-\alpha}{\tau_1 \cdot s + 1} + \frac{\alpha}{\tau_2 \cdot s + 1}, \quad \text{[Math. 27]}$$

where $$\tau_1 = \tau_{10} \cdot \left(\frac{T_f}{T_{f0}}\right)^{-n3} \cdot \left(\frac{m'_f}{m'_{f0}}\right)^{-n1}$$

$$\tau_2 = \tau_{20} \cdot \left(\frac{T_f}{T_{f0}}\right)^{-n6} \cdot \left(\frac{m'_f}{m'_{f0}}\right)^{-n4}$$

The estimated sensor output value calculating section 44 calculates the estimated sensor output value $T_{est}$ of the exhaust gas temperature sensor 31 by substituting the engine outlet estimated exhaust gas temperature $T_3$, which is calculated by the estimated gas temperature calculating section 43, into the fluid temperature $T_f$ of the expression (27). Thus, the estimated sensor output value $T_{est}$ that reflects a response delay of the sensor is calculated in real time from the engine outlet estimated exhaust gas temperature $T_3$, which varies with the running condition of the engine 10. The mass flow rate (mass flow rate of the exhaust gas) $m_f$ may be detected directly by an exhaust gas flow rate sensor (not illustrated)

or may be estimated on the basis of the running condition of the engine 10 that is derived from the engine revolution speed N and the accelerator position Q.

The exhaust gas temperature sensor diagnosis section 45 is an example of a diagnosis unit of the present invention, and makes a rationality diagnosis of the exhaust gas temperature sensor 31 on the basis of the actual sensor input value $T_{act}$ entered from the exhaust gas temperature sensor 31 and the estimated sensor output value $T_{est}$ calculated by the estimated sensor output value calculating section 44.

More specifically, the ECU 40 stores a temperature difference upper threshold value $T_0$, which is obtained (prepared) in advance through experiments or the like. The upper threshold for the temperature difference indicates a fault in the exhaust gas temperature sensor 31. The "fault" used herein includes, for example, a state in which the sensor cannot produce a sensor value (detection value) due to a short circuit, a break, or the like therein as well as a state in which the sensor cannot detect an accurate value. The exhaust gas temperature sensor diagnosis section 45 determines that a fault has occurred in the exhaust gas temperature sensor 31 when the temperature difference $\Delta T$ between the actual sensor input value $T_{act}$ and the estimated sensor output value $T_{est}$ exceeds the temperature difference upper threshold value $T_0$.

This determination of a fault does not have to be based on the temperature difference $\Delta T$ and may be made on the basis of the ratio $T_{act}/T_{est}$ of the actual sensor input value $T_{act}$ to the estimated sensor output value $T_{est}$. A sensor on which a diagnosis is made may be any sensor that detects a temperature substantially equal to the temperature detected by the exhaust gas temperature sensor 31 and may, for example, be the cooler inlet temperature sensor 37 disposed at the inlet of the EGR cooler 22.

Figure 2:
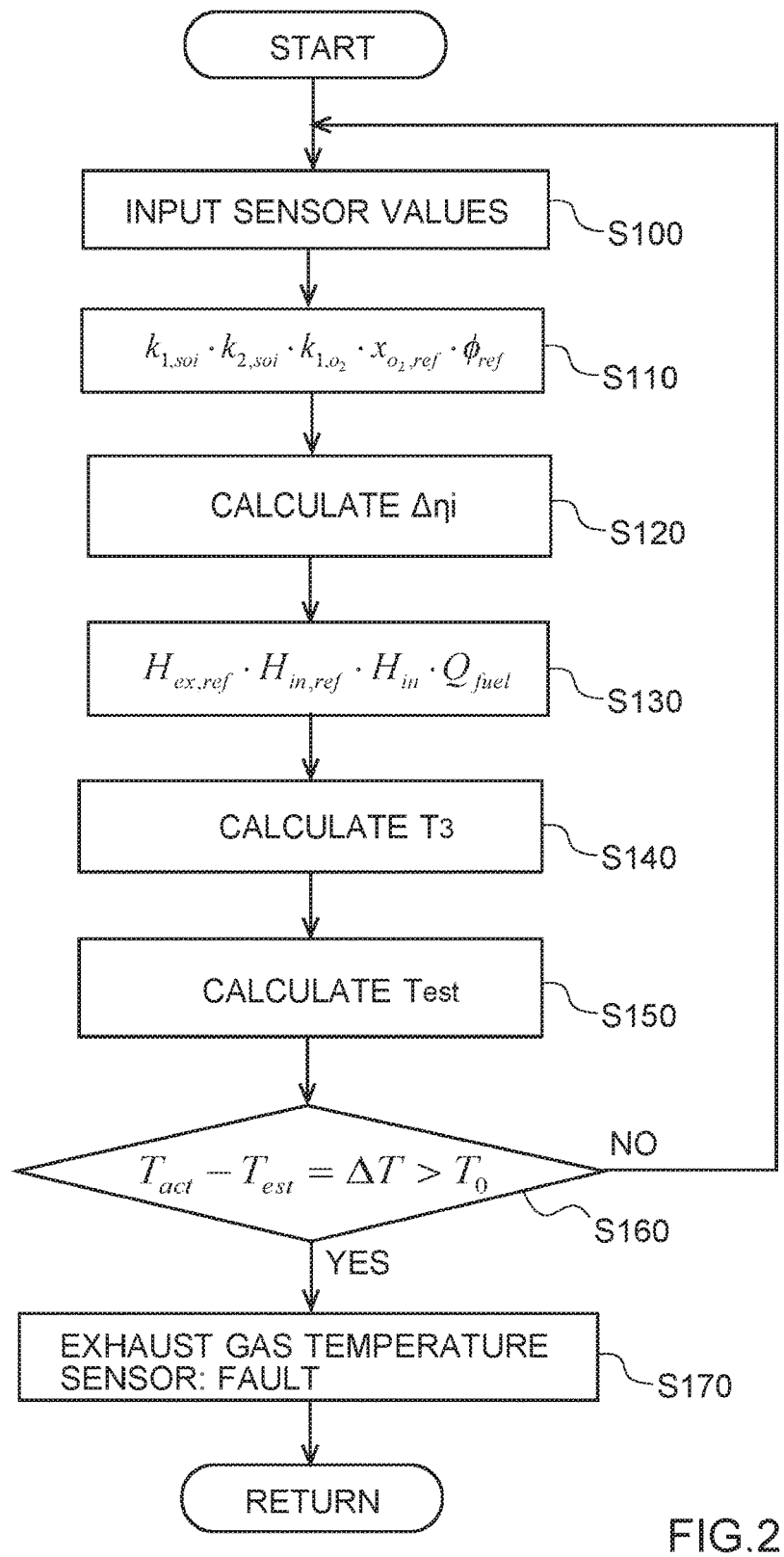
FIG. 2 is a flowchart illustrating the control performed by the sensor output value estimation device according to the embodiment of the present invention.
Figure 3:
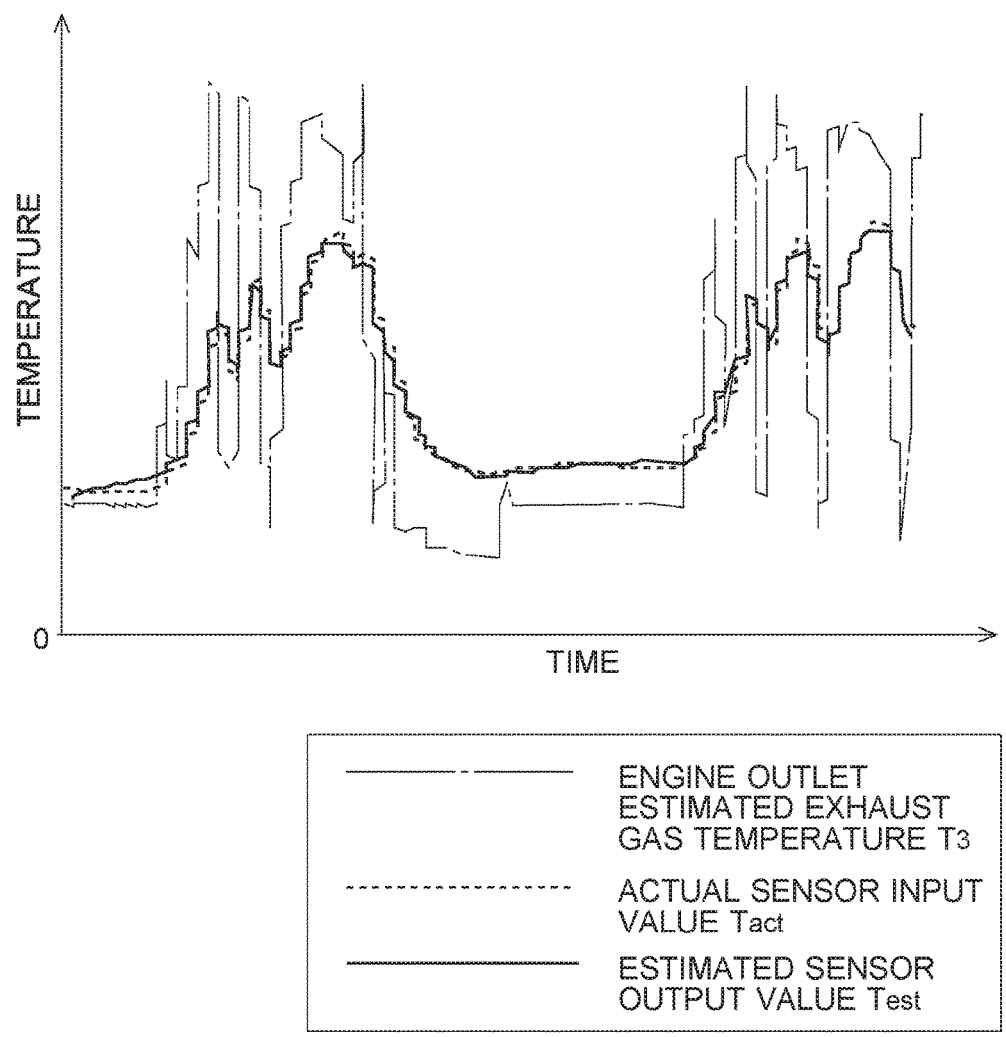
FIG. 3 is a graph comparing an estimated exhaust gas temperature of an engine and an estimated sensor output value, which are calculated by the sensor output value estimation device according to an embodiment of the present invention, together with an actual sensor input value detected by an exhaust gas temperature sensor.

Referring now to FIG. 2, a control process of the sensor output value estimation device according to this embodiment will be described.

In Step 100, the sensor values of the sensors 29 to 37 are supplied to the ECU 40 upon turning on of the ignition key.

In Step 110, in accordance with the running condition of the engine 10, the intake air oxygen concentration correction coefficient $k_{1,O2}$ and the injection start timing correction coefficient $k_{n(n=1,2),soi}$ are read out from the correction value maps, and the reference intake air oxygen concentration $X_{O2,ref}$ and the reference injection start timing $\phi_{ref}$ are read out from the reference value maps.

In Step 120, the amount of change $\Delta \eta_i$ in the indicated thermal efficiency is calculated through the model formula of the expression (9) on the basis of the values read out from the respective maps in Step 110, the intake air oxygen concentration $X_{O2}$ entered from the intake air oxygen concentration sensor 34, and the injection start timing $\phi$ determined by the fuel injection control section 41.

In Step 130, in accordance with the running condition of the engine 10, the reference intake air energy $H_{in,ref}$ and the reference exhaust gas energy $H_{ex,ref}$ are read out from the reference value maps, and the exhaust gas energy $H_{in}$ and the combustion energy $Q_{fuel}$ are calculated by the expressions (10) and (11).

In Step 140, the engine outlet estimated exhaust gas temperature $T_3$ is calculated through the model formula of the expression (7) on the basis of the amount of change $\Delta \eta_i$, in the indicated thermal efficiency calculated in Step 120, the values read out from the maps in Step 130, and the values calculated by the expressions (10) and (11).

In Step 150, the estimated sensor output value $T_{est}$ of the exhaust gas temperature sensor 31 is calculated by substituting into the expression (27) the mass flow rate $m_f$, which is estimated from the engine revolution speed N and the accelerator position Q entered in Step 100 (or detected directly by a sensor), and the engine outlet estimated exhaust gas temperature $T_3$, which is calculated in Step 140.

In Step 160, a diagnosis is made on the exhaust gas temperature sensor 31 on the basis of the temperature difference $\Delta T$ between the estimated sensor output value $T_{est}$ calculated in Step 150 and the actual sensor input value $T_{act}$ entered from the exhaust gas temperature sensor 31 in Step 100. When the temperature difference $\Delta T$ is greater than the threshold value $T_0$ (YES), it is determined in Step 170 that a fault has occurred in the exhaust gas temperature sensor 31. On the other hand, when the temperature difference $\Delta T$ is no greater than the threshold value $T_0$ (NO), the control is returned to Step 100. Thereafter, Steps 100 to 170 are iterated until the ignition key is turned off.

Effects and advantages provided by the sensor output value estimation device according to this embodiment will now be described.

Conventionally, when a rationality diagnosis is made on an exhaust gas temperature sensor, an estimated exhaust gas temperature estimated from the running condition of an engine is compared with an actual sensor output value of the exhaust gas temperature sensor. Because a response delay arises in the sensor output value of the exhaust gas temperature sensor, the technique in which the sensor value is simply compared with the estimated value may not provide an accurate diagnosis.

In contrast, the sensor output value estimation device according to this embodiment calculates the estimated sensor output value $T_{est}$ of the exhaust gas temperature sensor 31 in real time with the use of the expression (27) that reflects a response delay of the sensor. To reflect the response delay with high accuracy, this expression (27) takes the form of a secondary LPF that includes the relation between the time constant $\tau_1$ of the temperature change of the exhaust gas temperature sensor 31 and the physical quantity (exhaust gas flow rate $m_f$, exhaust gas temperature $T_f$) and the relation between the time constant $\tau_2$ of the temperature change of the exhaust passage (exhaust pipe) 12 and the physical quantity (exhaust gas flow rate $m_f$, exhaust gas temperature $T_f$). With such a secondary LPF, as illustrated in FIG. 3, the estimated sensor output value $T_{est}$ of the exhaust gas temperature sensor 31 that reflects a response delay of the sensor can be calculated with high accuracy through the entire operation range of the engine 10 including the transient operation thereof.

Thus, according to the sensor output value estimation device of this embodiment, the estimated sensor output value $T_{est}$ that reflects an influence of a response delay can be calculated effectively and can easily be compared with the actual sensor value $T_{act}$ of the exhaust gas temperature sensor 31. Therefore, it is possible to perform a rationality diagnosis with high accuracy.

It should be noted that the present invention is not limited to the above-described embodiment and can be implemented with modifications, as appropriate, within the scope that does not depart from the spirit of the present invention.

For example, although the engine outlet estimated exhaust gas temperature $T_3$ is calculated on the basis of the expressions (7) and (9) in the above-described embodiment, the engine outlet estimated exhaust gas temperature $T_3$ may be calculated through another model formula that includes the running condition of the engine 10, the quantity of state of the exhaust gas, or the like. In addition, although the estimated sensor output value $T_{est}$ is used in a diagnosis of the exhaust gas temperature sensor 31 in the above-described embodiment, the estimated sensor output value $T_{est}$ may be used in a diagnosis of the EGR cooler 22. In this case, the estimated sensor output value $T_{est}$ may be compared with the sensor value of the cooler outlet temperature sensor 36. It should also be noted that the engine 10 is not limited to a diesel engine. The present invention can be applied widely to other engines including a gasoline engine.

The invention claimed is:

1. A sensor output value estimation device comprising:
an actual temperature sensor at an exhaust passage of an engine; and
an electronic controller configured to—
compute an estimated gas temperature in proximity to the actual temperature sensor based on at least a running condition of the engine, exhaust gas energy and intake air energy; and
compute an estimated sensor output value, which reflects a response delay of the actual temperature sensor, based on the computed estimated gas temperature as an input and a first model formula that is pre-stored in a memory of the electronic controller and defines a relation among a time constant of a temperature change of the actual temperature sensor, a gas flow rate in proximity to the actual temperature sensor, and the estimated gas temperature.

2. The sensor output value estimation device according to claim 1, wherein the first model formula further includes a relation among a time constant of a temperature change of a pipe in which the actual temperature sensor is disposed, the gas flow rate, and the estimated gas temperature.

3. The sensor output value estimation device according to claim 1, wherein the electronic controller is further configured to—
diagnose the actual temperature sensor based on the estimated sensor output and an actual sensor output value detected by the actual temperature sensor.

4. The sensor output value estimation device according to claim 1, wherein the electronic controller is further configured to—
calculate an amount of change in an indicated thermal efficiency of the engine based on a second model formula that defines a relation among an intake air oxygen concentration of the engine, a fuel injection timing set in accordance with the running condition of the engine, and the amount of change in the indicated thermal efficiency, and
calculate an estimated exhaust gas temperature of the engine based on a third model formula that defines a relation between the calculated amount of change in the indicated thermal efficiency and an exhaust gas temperature.

5. The sensor output value estimation device according to claim 2, wherein the electronic controller is further configured to—
diagnose the actual temperature sensor based on the estimated sensor output value calculated and an actual sensor output value detected by the actual temperature sensor.

6. The sensor output value estimation device according to claim 2, wherein the electronic controller is further configured to—
calculate an amount of change in an indicated thermal efficiency of the engine based on a second model formula that defines a relation among an intake air oxygen concentration of the engine, a fuel injection timing set in accordance with the running condition of the engine, and the amount of change in the indicated thermal efficiency, and
calculate an estimated exhaust gas temperature of the engine based on a third model formula that defines a relation between the calculated amount of change in the indicated thermal efficiency and an exhaust gas temperature.

7. The sensor output value estimation device according to claim 3, wherein the electronic controller is further configured to—
calculate an amount of change in an indicated thermal efficiency of the engine based on a second model formula that defines a relation among an intake air oxygen concentration of the engine, a fuel injection timing set in accordance with the running condition of the engine, and the amount of change in the indicated thermal efficiency, and
calculate an estimated exhaust gas temperature of the engine based on a third model formula that defines a relation between the calculated amount of change in the indicated thermal efficiency and an exhaust gas temperature.

8. The sensor output value estimation device according to claim 1, wherein the actual temperature sensor is a sensor for detecting a temperature of the exhaust gas from the engine.

9. The sensor output value estimation device according to claim 1, wherein the actual temperature sensor is a sensor for detecting an outlet temperature of an exhaust gas recirculation cooler.

10. The sensor output value estimation device according to claim 1, wherein the running condition of the engine includes an engine revolution speed and an accelerator position.

11. The sensor output value estimation device according to claim 1, wherein the engine is a diesel engine.

* * * * *